United States Patent [19]

Yamamoto

[11] Patent Number: 4,941,948
[45] Date of Patent: Jul. 17, 1990

[54] WOOD POWDER-MOLDED PRODUCTS USING WOOD PULP AS THE BINDING AGENT

[76] Inventor: Junsaburo Yamamoto, 3-7-43 Koyanagi-cho, Fuchu-shi, Tokyo, Japan, 183

[21] Appl. No.: 195,865

[22] Filed: May 19, 1988

[30] Foreign Application Priority Data

May 22, 1987 [JP] Japan ................... 62-123881

[51] Int. Cl.$^5$ .............................. D21H 11/08
[52] U.S. Cl. .................... 162/142; 162/147; 162/149; 162/218; 162/221; 162/224; 162/227; 162/231
[58] Field of Search .......... 264/86; 162/142, 147, 162/149, 218, 221, 224, 227, 231

[56] References Cited

U.S. PATENT DOCUMENTS

| | | | |
|---|---|---|---|
| 1,769,519 | 7/1930 | King et al. | 264/86 XR |
| 2,016,329 | 10/1935 | Haight | 264/86 XR |
| 4,836,892 | 6/1989 | Edwards et al. | 162/141 |

FOREIGN PATENT DOCUMENTS

54-42403  4/1979  Japan ................... 162/142

Primary Examiner—Jan H. Silbaugh
Assistant Examiner—Mary Lynn Fertig

[57] ABSTRACT

Economical manufacturing of wood powder-molded products becomes possible with the introduction of wood pulp as the binding agent to be used in combination with water. The molded products feature not only high moisture absorbing capability and a unique natural touch of hybrid between wood and paper, but easy and convenient disposability after use. The product can be molded into any shape, but the method would be more suitable for manufacturing small-size pellet products form the practical standpoint to perform drying (dehydration) process. This invention enables to utilize wood powder resources including sawdust, which is currently disposed of in a huge amount as the industrial waste, all over the world.

2 Claims, No Drawings

WOOD POWDER-MOLDED PRODUCTS USING WOOD PULP AS THE BINDING AGENT

BACKGROUND OF THE INVENTION

The current annual consumption of timber in this country is approximately 70,000,000 cubic meters. Accordingly, a total of 700,000 to 1,000,000 tons of wood powder in dried weight equivalent is being arranged and disposed of throughout Japan every year.

In the process of manufacturing wood products including houses and furniture, generation of wood powder as process waste is unavoidable. Sawdust is a typical example. It is said that 2 to 3% of the original weight of the raw material will be turned to sawdust and wasted in a sawing process.

However, it is surprising therefore that there have been no inventions or discoveries during these past decades relating to the use of such an abundant and potentially useful resource which is available in vast quantities. Only examples of conventional uses of wood powder are as fuel in the form of sawdust powder and briquettes, as a raw material for perfume production, a core material for japanwares, heat insulating material and also some agricultural uses.

Even if some portion of the wood powder which is otherwise wasted can be utilized as a useful resource, it would be good news for all the forest related industries in the world.

The inventor responded by developing a method to make wood powder moldable by the use of a suitable binding agent, so that wood powder may be turned into a solid state material in a variety of shapes.

SUMMARY OF THE INVENTION

The inventor has been studying an economically practical method to bind wood powder particles together to make a molded materials such as wood powder pellets or larger items. He finally discovered that wood pulp fiber which has a microscopic structure similar to wood powder, works as an excellent and effective natural binding agent to glue wood powder particles to each other to make a kind of solid material, if the moistened mixture of the two materials is prepared and dried starting from a state in which the moisture content is between 60 and 75%. It was also discovered that the binding force will be increased if wood pulp which was obtained from waste pulp in a paper manufacturing process is used.

In addition, because of the nature of the bond (which is presumed to be a weak hydrogen bond), a molded product according to this invention, can be cut easily by a knife or broken, and dissolved by soaking for a certain amount of time in water. It suggests possibilities for recycled use of such resources as well as of convenient disposal of the used products into the public sewage system, etc.

DETAILED DESCRIPTION OF THE INVENTION

The aim of this invention is to utilize wood powder which is being disposed of as industrial waste, by developing a method to make wood powder moldable with the introduction of a new binder.

Conventionally glues or adhesives are used as the binder in a number of attempts to achieve the same purpose. But they have had problems in terms of cost and availability in bulk as well as product quality and disposal method (difficult to break them into smaller pieces).

The method according to this invention introduces wood pulp fiber as the binding agent to bind wood powder particles together, which is to be done with water. Water molecules' weak affinity force (like a hydrogen bond) seems to cause an intermediate bond between wood and pulp fibrils which have a similar microscopic structure to the former. (It is to be expected because the latter originates from the former.)

From the standpoint of the feasibility of the drying process and the limit in the bonding strength due to the binding agent, it is recommended that the method according to this invention is used particularly for manufacturing a product of relatively small size, such as particle-type molded products.

Manufacturing Procedure

1. Mix the two components, wood powder and wood pulp, in the proper ratio and add a suitable amount of water (15 times of the weight of the mixture is recommended). The quantities of wood powder and wood pulp shall be 80 to 20 parts out of the total quantity of the mixture before adding water.

2. Put the mixture in the desired molding unit which allows excess water to drain, and adjust the moisture content of the wet mixture by pressing or squeezing to a value within the range of 60% to 75%. (An additional molding process may be necessary depending on the desired shape of the products.)

3. Then start to dry the molded products which are still wet and fragile, using suitable means such as a hot-air blower, to obtain the final product(s).

Conditions for the Above Process

In order for pulp wood fiber to work as the binder, the following conditions must be met:

1. The particle size of the wood powder must be not greater than 10 mesh because of the limit in the strength of the bond which the binding agent can create.

2. The wood pulp to be used as the binding agent must have a heating degree in the range between 170 and 200 by Canadian Freeness Standard (refered to as C.F.S., hereinafter).

3. It is essential to start the drying process with the mixture being set at a moisture content of between 60% and 75%. Otherwise, it will not work.

Embodiment

To make a molded product in the form of round pellets using sawdust as the raw material:

Mix 50 parts of wood powder of 40 mesh and 50 parts of beaten wood pulp with a beating degree of 180 C.F.S., by dry weight equivalence respectively, in a container and add water at the rate of 15 times of the total weight of the mixture and knead well for 12 minutes. Then put it on a case having a flat net floor and press it with a flat lid to reduce the moisture content to 68%.

Then put the moistened mixture in an extruder unit to extrude it into cylindrical pellets through small holes of 4 millimeters in diameter. The length of the pellet will be close to the diameter because of the fragility of the mixture. Then perform an additional step to round the above product in a cylindrical shape which is still moist (the moisture content should still be maintained at 68%)

and it is fragile, using a shaping-up unit equipped with a rotating disk or a rotating cylinder.

Then dry the molded round pellets with a heat blower for five hours.

The physical properties of the molded pellet product made according to the above process are indicated below:

Specific weight: 0.27 to 0.31
Moisture absorbing capacity: 2.6 to 3.1
Sedimentation: Starts to sediment after several minutes of soaking in water

EFFECT OF THE INVENTION

A molded product manufactured according to this invention is a compound material between wood powder and wood pulp, and features water absorbing capabilities and a unique natural touch that is a hybrid of the two starting materials, which ordinary artificial materials such as plastics do not have. It would be a very attractive and advantageous factor when used in the medical, agricultural and biological fields in forms such as disposable type of absorbent bedding for animals, pet litter box filler, human toilet medium, water and oil absorbents and cultivation bed for seeds and fungi. It is expected that the product could replace a great number of common existing products in various applications. Another feature of the resulting products according to this invention is that they can be disposed or after use. They can be very easily and conveniently broken into smaller pieces by using a cutting tool if necessary, or burnt in an incinerator or flushed away into the sewage system, after the use.

The characteristic that the product will naturally dissolve in water in 72 hours after soaking makes it possible not only to dispose of it in the sewage system (although this depends on the product size), but also to reuse the dissolved material as recycled raw material for a product according to this invention.

Namely, this invention permits the manufacture of a wood powder molded product which can be recycled for reuse as a raw material and can be disposed of conveniently and hygienically by common methods.

I claim:

1. A method of manufacturing a molded product of wood powder using a wood pulp binder, comprising:
    preparing a solids mixture of 100 parts by weight consisting of 20 to 80 parts by weight wood powder having an average particle size between 10 and 100 mesh and 20 to 80 parts by weight of wood pulp having a beating degree between 170 and 200 C.S.F.;
    adding water to the solids mixture in an amount of 15 times the weight of the solids mixture and mixing to form a homogeneous mixture;
    adjusting the moisture content of the homogeneous mixture to between 60% and 75%;
    molding the homogeneous mixture; and
    drying the molded mixture having the adjusted moisture content.
2. The product produced by the method of claim 1.

* * * * *